United States Patent [19]
Mischel

[11] Patent Number: 4,572,258
[45] Date of Patent: Feb. 25, 1986

[54] CHAIN FLAIL

[76] Inventor: Kenneth J. Mischel, 1950 SW. Berry Lake Rd., Port Orchard, Wash. 98366

[21] Appl. No.: 694,943

[22] Filed: Jan. 24, 1985

[51] Int. Cl.⁴ .............................................. B27L 1/00
[52] U.S. Cl. ................................ 144/208 J; 56/294; 144/2 Z; 241/191; 241/193
[58] Field of Search ................. 144/2 N, 2 Z, 208 R, 144/208 J; 56/12.7, 294; 241/189 R, 191, 193, 194; 172/43

[56] References Cited

U.S. PATENT DOCUMENTS

| | | | |
|---|---|---|---|
| 2,792,860 | 5/1957 | Watkins | 144/208 J |
| 2,893,451 | 7/1959 | Dickerson | 144/208 J |
| 4,172,481 | 10/1979 | Brisson | 144/208 J |

FOREIGN PATENT DOCUMENTS

| | | | |
|---|---|---|---|
| 1360289 | 3/1964 | France | 144/208 J |
| 83369 | 3/1954 | Norway | 144/208 J |
| 1045790 | 10/1966 | United Kingdom | 144/208 J |

*Primary Examiner*—W. D. Bray
*Attorney, Agent, or Firm*—Seed and Berry

[57] ABSTRACT

A flail device for use in conjunction with debarking or delimbing apparatus is disclosed. The device comprises a rotatable drum having a plurality of circumferentially spaced-apart rows of longitudinally spaced-apart openings, a plurality of rods extending longitudinally within the drum, each of the rods positioned radially inward of the openings, and a plurality of guide plates rigidly attached to the drum for rotation therewith. The guide plates have slots sized to removably receive and support the rods. A plurality of chain flails are attached to each of the rods, attachment being by extension of the rod through an interior aperture of an attaching link of the flail. The rods have a size in the radial direction to substantially fill the aperture of the attaching link to minimize the radial movement of the attaching link relative to the rod during usage.

22 Claims, 5 Drawing Figures

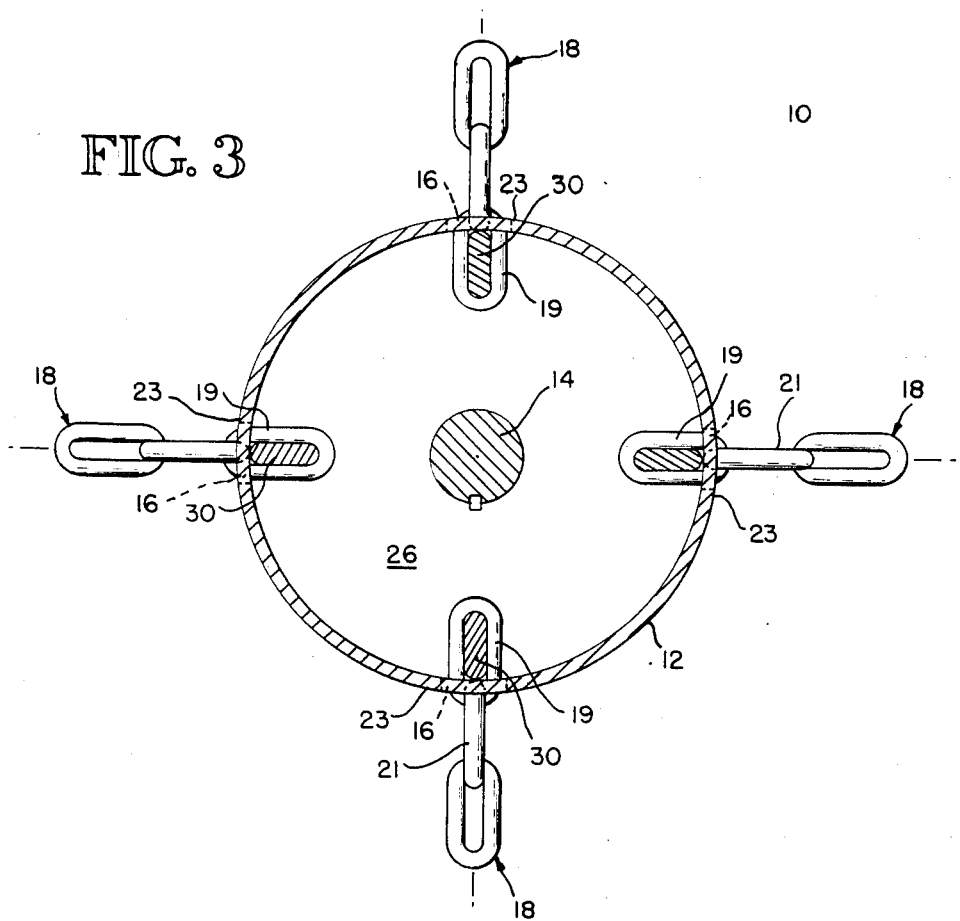
FIG. 3
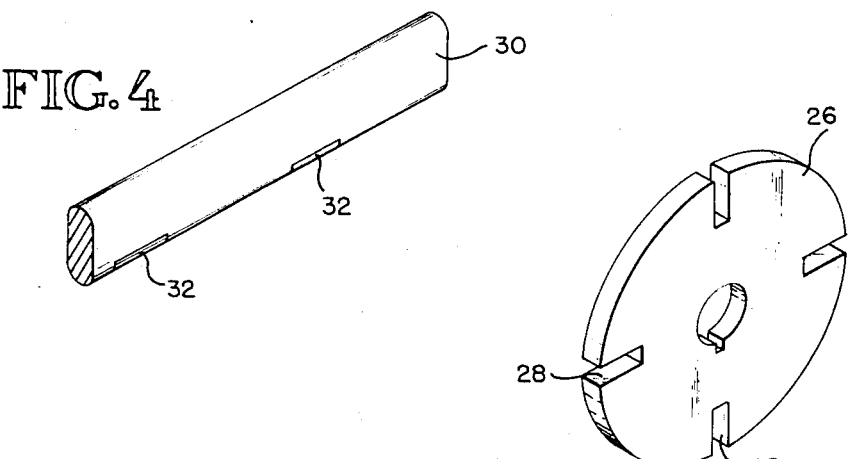
FIG. 4
FIG. 5

CHAIN FLAIL

TECHNICAL FIELD

The present invention relates to devices for use is debarking and delimbing trees in general, and more specifically, to an improved chain flail.

BACKGROUND ART

Delimbing and debarking devices have traditionally consisted of a feedway for advancing and controlling the movement of trees or bark-bearing slabs, and a rotatable drum which retains a number of flexible flails for detaching branches and bark from the trees or slabs as they are conveyed past the rotating drum.

Conventional methods for connecting chain flails to the rotatable drum consist of either (1) welding clips or lugs to the periphery of the drum and securing a link of the chain thereto through the use of nut and bolt assemblies, as in U.S. Pat. Nos. 4,023,604 and 4,061,166, or (2) providing a drum surface with a series of holes into which a portion of the end link of the chain may extend, the end link being retained to the drum by a circular rod which passes through a portion of the link, as in U.S. Pat. Nos. 2,792,860 and 2,994,352.

While the latter type of retention is somewhat more desirable than securing the link to the outer surface of the drum, since the point of connection of the chains is interior to the drum and protected from contact by the free swinging portion of the chains, it is still disadvantageous in many respects. Further, the prior art does not reveal a design which reduces the shock placed upon the attaching end link while concurrently providing an arrangement which exhibits both increased bar shear strength, decreased bar wear, and reduced bar deflection.

Consequently, there exists a need in the art for an improved flail device which provides the features noted above as well as other related advantages.

DISCLOSURE OF INVENTION

Briefly stated, the present invention provides an improved flail device for use in conjunction with debarking or delimbing apparatus. The device generally consists of a rotatable drum provided with a plurality of circumferentially spaced-apart rows of longitudinally spaced-apart openings, a plurality of rods extending longitudinally within the drum, each of the rods positioned radially inward of one of the rows of openings, and a plurality of guide plates rigidly attached to the drum for rotation with the drum. The guide plates are provided with slots sized to removably receive and support the rods for rotation therewith. A plurality of chain flails consisting of a length of interconnected chain links are attached to each of the rods through the openings in the drum, attachment of the flail to the rods being by extension of the rods through an interior aperture defined by an attaching link of the chain, the rods having a size in the radial direction to substantially fill the aperture of the attaching link to minimize radial movement of the attaching link relative to the rod.

In addition, in one embodiment of the present invention, a substantial portion of the attaching link and a portion of the next adjacent chain link are positioned below the surface of the opening in the drum, thereby protecting the attachment from damage caused by the impact of the flail.

Other features and advantages of the invention will become apparent from the following detailed description, taken in conjunction with the accompanying drawings.

BRIEF DESCRIPTION OF THE DRAWINGS

FIG. 3 is an enlarged cross-sectional view taken substantially along the line 3—3 of FIG. 2.

FIG. 4 is an enlarged, fragmentary isometric view of a rod shown in FIG. 3.

FIG. 5 is a reduced-scale, isometric view of a guide plate shown in FIG. 3.

BEST MODE FOR CARRYING OUT THE INVENTION

Figure 1:
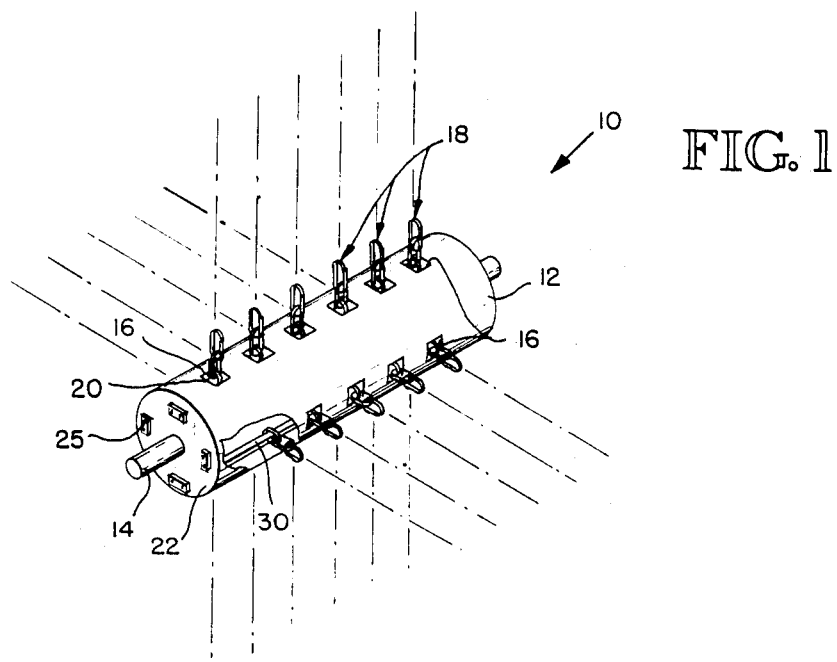
FIG. 1 is an isometric view of a device embodying the present invention.

In reference to FIG. 1, flail device 10 therein shown comprises a rotatable drum 12 mounted on a rotatable drive shaft 14. The drum is generally cylindrical and is provided with a plurality of longitudinally spaced openings 16 arranged in a series of spaced-apart rows each sized for a chain or flail 18 to pass therethrough. It is preferable to fashion each of the openings 16 to have a circumferential dimension which is slightly greater than the width of one of the chain links of the flails 18 but sufficiently small to minimize circumferential movement of the links. This arrangement reduces circumferential movement of the flails 18 and aids in gaining access to the interior of the drum to facilitate the replacement of the flail while continuing to provide a protective shield for the internal components of the drum.

Further, it is preferable to fashion each of the openings 16 to have a longitudinal dimension substantially larger than the thickness of an attaching link 19 of the flail 18 in order to permit the attaching link to slide on one of a plurality of attachment rods 30. With this arrangement, wear upon the rod 30 by the attaching link 19 during usage is distributed over an enlarged region of the rods. The edges 20 of the opening 16 may be slightly beveled and/or hardened in order to reduce wear caused by the impact of the chain upon the surface.

Figure 2:
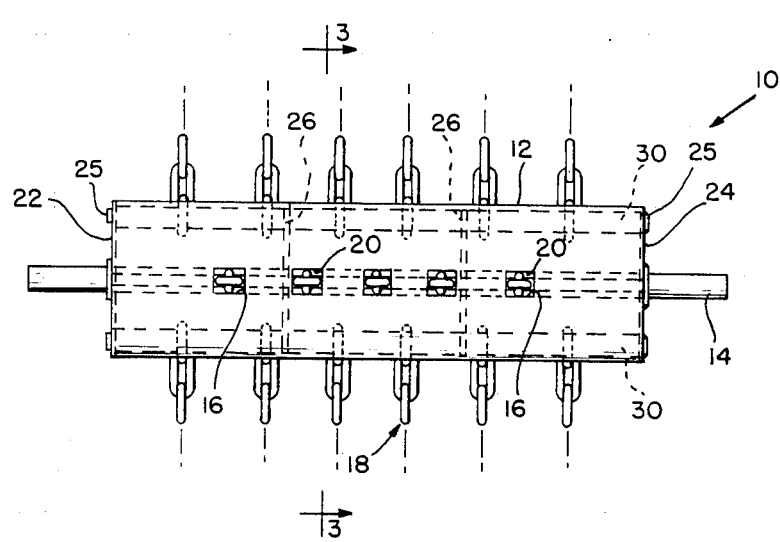
FIG. 2 is an enlarged side elevational view of the device of FIG. 1.

Turning now to FIG. 2, the drum 12 is provided with a pair of end guide plates 22 and 24. The end guide plates 22 and 24 are fixedly attached, as by welding, to the inner wall of the drum at opposite ends thereof. Positioned within and fixed to the perimeter of the drum 12, such as by welding, are a pair of additional guide plates 26. Both the guide plates 26 and the guide plates 22 and 24 are provided with slots 28 (best shown in FIG. 5 for guide plate 26) adapted to removably receive and support rods 30. The rods 30 extend longitudinally within the drum 12 and are positioned radially inward of the openings 16. The slots 28 are provided with open ends to allow the rods to engage the inner wall or surface of the drum, thereby limiting the outward movement of the rods. It is preferable to position the guide plates in the spaced arrangement such as shown in FIG. 2, in order to prevent deflection of the rods 30 as stress is placed upon them by the force of the chains during usage of the flail device 10.

As shown in FIG. 3, each of the guide plates 22 and 24 is also keyed into the drive shaft 14 for rotation therewith. Since the guide plates are welded or fixed in some other manner to the inner wall of the drum 12, the slots 28 serve to hold the rods in position relative to the drum and the guide plates apply force on the rods for positive rotation with the drum.

Referring again to FIG. 2, in order to prevent the rods 30 from sliding longitudinally out of the slots 28 of either of the end guide plates 22 or 24, the end guide plates are provided with a series of retainers 25. The retainers 25 for end guide plate 22 are removable plates, and the retainers on the end guide plate 24 are fixedly attached, such as by welding. In the presently preferred embodiment, the retainers 25 on the end guide plate 22 are removably attached through the use of a set of countersunk bolts, to provide for the rapid removal of the rods 30 from the drum 12. It is preferable to countersink the bolts in order to protect the heads of the bolts from damage caused by the impact of the chains during usage.

Turning now to FIG. 3, the rods 30 are preferably composed of steel having good shear strength and are designed such that they will substantially fill the interior opening defined by the first or attaching link 19 of the flail 18. In accordance with the invention, the rods are generally rectangular in shape and have slightly beveled edges in order to better fill the aperture in the attaching link 19. In this manner, the radial movement of the attaching link 19 is reduced during usage, thereby reducing the shock on the rod 30 to which the link is attached resulting from the flail 18 engaging or getting tangled with a tree or slab being delimbed or debarked, which otherwise could cause breakage of the flail.

By increasing the dimensions of the rods 30 in the direction of the radial force of the link upon the rod, the capacity and strength of the rod is greatly enhanced. As best shown in FIG. 4, in order to reduce the wear upon the rod 30 caused by the frictional movement and impact of the attaching link 19 against the rod during usage, the rod is provided with hardened areas 32 of contact. It is preferable to provide these hardened areas 32 at the radially inward portion of the rod 30, and further form the hardened areas with longitudinal dimensions substantially coextensive with the longitudinal dimension of the corresponding opening 16 in the drum 12. By forming the hardened areas in this manner, the rod is less susceptible to frictional wear from the attaching link 19, while still retaining enough unhardened steel in the body of the rod to provide adequate shear strength.

The attaching link 19 is secured to the rod by passing the rod through the attaching link. As shown in FIG. 3, a majority of the body of the attaching link and a portion or shoulder of the next adjacent link 21 are positioned within the drum or below the outer surface 23 of the opening 16. This arrangement serves to keep substantially the entire attachment of the rod 30 and the immediate chain attached thereto within the protective shield provided by the drum, thereby substantially eliminating any damaging impact of the flail upon the rod or attaching link 19, while still providing easy access to the interior of the drum.

When it becomes necessary during operation to replace a damaged flail 18, the arrangement noted above, due in part to the protection provided by positioning the attachment components within the drum, allows an operator to simply remove the countersunk bolts which hold the retainers 25 in place, and pull one of the rods 30 outward a distance sufficient to release the damaged flail from the rod and to allow the rod to pass through the attaching link 19 of the replacement flail. In order to facilitate rapid removal of the rod from the drum, the rod may be tapped for threaded connection of a suitable extraction device, such as a slide hammer or other pulling device.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A flail device comprising:
   a rotatable drum, said drum having a plurality of circumferentially spaced-apart rows of longitudinally spaced-apart openings;
   a plurality of rods extending longitudinally within said drum, each of said rods being positioned radially inward of one of said rows of openings;
   a plurality of guide plates rigidly attached to said drum for rotation with said drum, said guide plates having slots sized to removably receive and support said rods for rotation therewith; and
   a plurality of chain flails attached to each of said rods, each of said flails having a length of interconnected chain links passing through one of said drum openings and attached to one of said rods positioned radially inward thereof, attachment being by said one rod extending through an interior aperture defined by an attaching link of said chain links, said rods having a size in the radial direction to substantially fill said apertures of said attaching links to minimize radial movement of said attaching links relative to said rods during usage.

2. The device of claim 1 wherein a substantial portion of said attaching links and a portion of the next adjacent chain link are positioned below the surface of said opening in the drum.

3. The device of claim 1 wherein said drum openings have a circumferential dimension larger than the width of said attaching links, but sufficiently small to minimize circumferential movement of said attaching links on said rods.

4. The device of claim 1 wherein said drum openings have a longitudinal dimension substantially larger than the thickness of said attaching links to permit said attaching links to slide on said rods, whereby wear of said rods by said attaching links during usage is distributed over an enlarged region of said rods.

5. The device of claim 1 wherein said openings have edges which are inwardly beveled and hardened to reduce wear.

6. The device of claim 1 wherein radially inward portions of said rods at which said attaching links are attached are hardened to reduce wear on said rods.

7. The device of claim 6 wherein said hardened portions extend at least substantially coextensive with the longitudinal dimension of said drum openings.

8. The device of claim 1, further including a pair of retainers attached to the outer two of said guide plates to retain each of said rods against longitudinal movement, one of said retainers being fixedly attached to one of said outer two guide plates, and the other of said retainers being removably attached to the other of said two outer guide plates.

9. The device of claim 8 wherein said removable retainer is attached to said guide plate by a series of countersunk bolts.

10. The device of claim 1, further including means for rapid removal of said rods from said drum.

11. The device of claim 1, further including a rotatable drive shaft extending through said guide plates and drivingly connected to at least one of said guide plates to transmit rotational force to said drum.

12. The device of claim 1 wherein said slots are provided with open ends and are positioned at the perimeter of said guide plates, thereby allowing said rod to engage an inner wall of said drum to limit the outward movement of said rod.

13. A flail device comprising:
a rotatable drum having a plurality of longitudinally spaced-apart openings;
a plurality of chain flails having a length of interconnecting chain links, with at least one of said flails passing through each of said drum openings and having at least one elongated attaching link toward an end of said flail and positioned within said drum;
at least one rod extending longitudinally within said drum and positioned inward of said openings, said rod having a cross-sectional shape sized to substantially fill the interior aperture of said attaching link and extending through said attaching link aperture, said rod being positioned with its larger dimension oriented in the radial direction, said rod having hardened portions along the radially inward side thereof whereat said attaching links of said flail engage said rod and having unhardened portions radially outward of said hardened portions to maintain the shear strength of said rod;
a plurality of guide plates rigidly attached to said drum for rotation with said drum, said guide plates have slots sized to removably receive and support said rod against deflection and for rotation with said drum; and
means for releasably retaining said rod within said drum and supported by said guide plates, and for selective withdrawal of said rod from said drum.

14. The device of claim 13 wherein a substantial portion of said attaching link and a portion of the next adjacent link are positioned below the surface of said opening in the drum.

15. The device of claim 13 wherein said openings in the drum have a circumferential dimension larger than the width of said attaching link, but sufficiently small to minimize circumferential movement of said attaching link on said rod.

16. The device of claim 13 wherein said drum openings have a longitudinal dimension substantially larger than the thickness of said attaching links to permit said attaching links to slide on said rods, whereby wear of said rods by said attaching links during usage is distributed over an enlarged region of said rods.

17. The device of claim 13 wherein said openings have edges which are inwardly beveled and hardened to reduce wear.

18. The device of claim 13 wherein said hardened portions extend at least substantially coextensive with the longitudinal dimension of said drum openings.

19. The device of claim 13, further including a pair of retainers attached to the outer two of said guide plates to retain each of said rods against longitudinal movement, one of said retainers being fixedly attached to one of said outer two guide plates, and the other of said retainers being removably attached to the other of said two outer guide plates.

20. The device of claim 19 wherein said removable retainer is attached to said guide plate by a series of countersunk bolts.

21. The device of claim 13, further including a rotatable drive shaft extending through said guide plates and drivingly connected to at least one of said guide plates to transmit rotational force to said drum.

22. The device of claim 13 wherein said slots are provided with open ends and are positioned at the perimeter of said guide plates, thereby allowing said rod to engage an inner wall of said drum to limit the outward movement of said rod.

* * * * *